United States Patent [19]

Ota et al.

[11] Patent Number: 4,886,857

[45] Date of Patent: Dec. 12, 1989

[54] STYRENE BASED RESIN COMPOSITION

[75] Inventors: Masanori Ota; Fumio Akutsu; Kazuo Takahashi, all of Iwaki, Japan

[73] Assignee: Kureha Kagaku Kogyo K. K., Tokyo, Japan

[21] Appl. No.: 171,031

[22] Filed: Mar. 21, 1988

[30] Foreign Application Priority Data

Mar. 25, 1987 [JP] Japan .................... 62-069130

[51] Int. Cl.$^4$ .................. C08L 25/04; C08L 51/04
[52] U.S. Cl. .............................. 525/74; 525/79; 525/84
[58] Field of Search ............. 525/286, 74, 79, 84

[56] References Cited

U.S. PATENT DOCUMENTS

| | | | |
|---|---|---|---|
| 4,315,081 | 2/1982 | Kobayashi et al. | 525/74 |
| 4,341,882 | 7/1982 | Katchman | 525/133 |
| 4,384,078 | 5/1983 | Ohya et al. | 525/79 |
| 4,631,307 | 12/1986 | Hosoda et al. | 525/64 |

FOREIGN PATENT DOCUMENTS 21012 6/1977 Japan .
30739 7/1984 Japan .
55333 11/1986 Japan .

OTHER PUBLICATIONS

Abstract, Japanese Patent 59-20354, 2/84.

Primary Examiner—Allan M. Lieberman
Attorney, Agent, or Firm—Lowe, Price, LeBlanc, Becker & Shur

[57] ABSTRACT

Styrene based resin compositions comprise a styrene resin and a graft copolymer obtained by graft-polymerizing, in the presence of a butadiene based rubbery polymer, a monomer mixture composed of a monomer containing 1–50 ethylene oxide groups and one ethylenically-unsaturated bond and styrene or a monomer mixture compound of styrene as a principal component and at least one monomer copolymerizable with styrene. The a styrene based resin compositions are obtained by blending the graft copolymer with a styrene resin and having excellent impact strength and visual properties.

3 Claims, No Drawings 4,886,857

STYRENE BASED RESIN COMPOSITION

FIELD OF THE INVENTION

This invention relates to a novel graft copolymer and also to a styrene based resin composition composed of the graft copolymer and a styrene resin. More specifically, the present invention is concerned with a graft copolymer obtained by graft-polymerizing, in the presence of a butadiene based rubbery polymer, a monomer mixture composed of a monomer containing 1–50 ethylene oxide groups and one ethylenically-unsaturated bond and styrene or a monomer mixture composed of styrene as a principal component and at least one monomer copolymerizable with styrene, and also with a styrene based resin composition obtained by blending the graft copolymer with a styrene resin and having excellent impact strength and visual properties.

BACKGROUND OF THE INVENTION

It has conventionally been well-known to obtain an impact-resistant polystyrene resin by blending polystyrene, a hard polymer, with a natural or synthetic rubbery polymer or with a graft copolymer of a rubbery polymer as a backbone polymer and a hard resin-forming monomer, such as styrene, graft-polymerized on the rubbery polymer. Blend-type or graft-blend type rubber-modified polystyrene resins obtained by such a conventional process are however still dissatisfactory in impact strength, visual properties of articles to be molded, etc. In addition, graft copolymers obtained by grafting styrene in the presence of a rubbery polymer latex are prone to agglomeration and are hence accompanied by a handling problem.

On the other hand, graft-type rubber-modified impact-resistant polystyrene resins produced by dissolving a rubbery polymer in styrene and then subjecting them to solution polymerization are excellent in impact strength, stiffness, processability, etc. They are hence used as materials for molded articles such as components of electric appliances, packaging containers, toys and games and sundries.

Although the conventional impact-resistant polystyrene resins are superior in impact strength to polystyrene not subjected to rubber modification, their impact strength is inferior to that of acrylonitrile-butadiene-styrene copolymer resins (ABS resins). The conventional impact-resistant polystyrene resins are thus accompanied by a drawback that a limitation is imposed on their use in a field where a high degree of strength is required, such as car components and the like. Moreover, rubber-modified polystyrene resins are accompanied by a further drawback that their molded products are lower in gloss and less attractive in visual properties compared with polystyrene and ABS resins. It has been proposed to use a styrene-butadiene block copolymer as a rubbery polymer in order to improve the impact resistance of a rubber-modified polystyrene resin (Japanese Patent Publication Nos. 21012/1977, 30739/1984 and 55533/1986). Such a proposal is however still insufficient for obtaining a high degree of impact resistance.

OBJECTS AND SUMMARY OF THE INVENTION

An object of this invention is to provide a styrene based resin composition which can provide a molded article having excellent impact resistance, high gloss and superb visual properties.

Another object of this invention is to provide a novel blending graft copolymer which can impart high gloss along with impact resistance to thermoplastic resins including styrene resins.

A further object of this invention is to obtain a styrene based resin composition which may contain rubber-unmodified polystyrene or a rubber-modified polystyrene resin as a styrene resin and is improved in both impact resistance and surface gloss.

The present invention has been completed on the basis of a finding that a graft copolymer, which has been obtained by using a butadiene based rubbery polymer as a backbone polymer and then graft-polymerizing a monomer composed as essential components of styrene and a special monomer containing one or more ethylene oxide groups, can provide a styrene based resin composition having impact resistance improved over the corresponding styrene resin and having excellent visual properties.

In one aspect of this invention, there is thus provided a graft copolymer obtained by graft-polymerizing, in the presence of (A) 50–80 parts by weight of a rubbery copolymer obtained from butadiene or a mixture of at least 50 wt. % of butadiene and less than 50 wt. % of at least one monomer which is other than butadiene and is copolymerizable with butadiene, (B) 50–20 parts by weight of a monomer mixture composed of (B-1) 0.5–45 wt. % of a monomer containing 1–50 ethylene oxide groups and one ethylenically-unsaturated bond and (B-2) 99.5–55 wt. % of styrene or a monomer mixture composed of at least 55 wt. % of styrene and less than 45 wt. % of at least one monomer which is other than styrene and is copolymerizable with styrene, the sum of said rubbery polymer (A) and said monomer mixture (B) being 100 parts by weight.

In another aspect of this invention, there is also provided a styrene based resin composition comprising (I) 100 parts by weight of a styrene resin and (II) 1–100 parts by weight of the above graft copolymer and having excellent impact strength and visual properties.

In this invention, the graft copolymer uses, as an essential graft component to be graft-polymerized in the presence of the butadiene based rubbery polymer, the monomer containing 1–50 ethylene oxide groups and one ethylenically-unsaturated bond. Where the graft component is styrene or a mixture of styrene and another co-monomer as in the prior art, it is impossible to obtain a styrene based resin composition —which is the target of the present invention, namely, which has high impact resistance and excellent gloss —even if such a graft copolymer is blended with a styrene resin. When the monomer mixture, which is composed essentially of styrene and the monomer containing 1–50 ethylene oxide groups and one ethylenically-unsaturated bond, is used as a graft component, the addition of the resulting graft copolymer to a styrene resin can provide a styrene based resin composition having significantly-improved impact strength and moreover satisfactory visual properties.

A graft copolymer latex containing as a graft component styrene or a mixture of styrene as a principal component and another co-monomer is accompanied by a drawback that the graft copolymer tends to agglomerate in the course of its coagulation or salting-out from the latex or its drying and is hence very inferior in handling properties. In a latex of the graft copolymer according to this invention, such agglomeration of the graft copolymer does not take place so that the graft copolymer is provided as powder having excellent handling properties.

The styrene resin useful in the practice of this invention may be a rubber-unmodified hard polymer such as polystyrene or styrene-acrylonitrile copolymer or a rubber-modified polystyrene resin.

DETAILED DESCRIPTION OF THE INVENTION

The graft copolymer and styrene-based resin composition of this invention will hereinafter be described in detail.

Graft Copolymer

The rubbery polymer, which serves as the backbone polymer of the graft copolymer, is a butadiene based rubbery polymer produced by subjecting butadiene or a mixture of at least 50 wt. % of butadiene and less than 50 wt. % of another monomer copolymerizable with butadiene to emulsion polymerization in a manner known per se in the art.

As illustrative examples of the monomer copolymerizable with butadiene, may be mentioned aromatic vinyl compounds such as styrene and α-methylstyrene; alkyl methacrylates such as methyl methacrylate and ethyl methacrylate; alkyl acrylates such as methyl acrylate and ethyl acrylate; unsaturated nitriles such as acrylonitrile and methacrylonitrile; vinyl ethers such as methyl vinyl ether and butyl vinyl ether; vinyl and vinylidene halides such as vinyl chloride and vinylidene chloride; vinyl esters such as vinyl acetate; diolefins such as isoprene and chloroprene; etc.

A crosslinkable monomer copolymerizable with the monomer may be added as needed upon production of the rubbery polymer, whereby the rubbery polymer is crosslinked. Such a crosslinkable monomer is effective in enhancing the stress-whitening resistance and may be used-suitably in an amount not greater than 3 wt. %, preferably, in an range of 0.1-2.5 wt. %. However, any amounts greater than 3 wt. % lead to a reduction in the impact-resistance-imparting property of the graft copolymer and are hence not preferred.

Illustrative examples of the crosslinkable monomer may include aromatic polyfunctional vinyl compounds such as divinylbenzene and divinyltoluene; the di- and tri-methacrylates and di- and tri-acrylates of polyhydric alcohols, such as ethylene glycol dimethacrylate, triethylene glycol dimethacrylate and 1,3-butanediol diacrylate; allyl compounds such as diallyl maleate, diallyl phthalate and allyl methacrylate; and so on.

It is also feasible to use a chain transfer agent in an amount up to about 3 wt. % so as to adjust the gel fraction of the rubbery polymer.

As the chain transfer agent, any one of chain transfer agents employed usually in emulsion polymerization, for example, octyl mercaptan, dodecyl mercaptan, lauryl mercaptan or the like may be used.

The average particle size of the rubbery polymer latex is controlled generally within a range of 0.08-0.8 μm.

If the average particle size of the rubbery polymer latex is too small, its impact-resistance-imparting property is reduced. On the other hand, any unduly large average particle sizes reduce the surface gloss of a thermoplastic resin composition. Such excessively small and large average particles are both not preferred accordingly.

The average particle size of the rubbery polymer latex may be controlled suitably within a desired range by choosing the kinds and amounts of emulsifier and catalyst and the polymerization temperature to be employed in emulsion polymerization. As an alternative, the particle size may be controlled within a desired average particle size range by forming in advance a rubber polymer latex having an average particle size of 0.05-0.2 μm and then adding a coagulant to the rubber polymer latex. As the coagulant, it is possible to use an electrolytic substance employed in general, for example, an inorganic acid such as hydrochloric acid or sulfuric acid; an organic acid such as acetic acid, malic acid or maleic acid; a salt such as sodium chloride, calcium chloride or magnesium chloride; or the like.

Monomer Containing Ethylene Oxide Groups

The monomer, which contains ethylene oxide groups and is useful in the present invention, is a monomer containing 1-50, preferably, 2-40 ethylene oxide groups and one ethylenically-unsaturated bond.

Illustrative examples of the monomer containing ethylene groups may include methoxy monoethylene glycol methacrylate, methoxy monoethylene glycol acrylate, methoxy polyethylene glycol methacrylates, methoxy polyethylene glycol acrylates, ethylene glycol acrylamide and polyethylene glycol acrylamide (the polyethylene glycol residuum in each of the methoxy polyethylene glycol methacrylates, methoxy polyethylene glycol acrylates contains 2-50 ethylene oxide groups). Of these, methoxy polyethylene glycol acrylates and methoxy polyethylene glycol methacrylates are preferred.

When a monomer containing one or more ethylene oxide groups is used as a graft component in combination with styrene, a resin composition improved in both impact strength and visual properties is obtained upon mixing of the resultant graft copolymer with a styrene resin. The combined use of such a monomer is also effective in preventing the possible agglomeration of the graft copolymer in the course of coagulation (salting-out) or drying of the resultant wet cake of the graft copolymer and in significantly improving the handling properties of the graft copolymer after its drying.

If the monomer contains too many ethylene oxide groups, the resulting graft copolymer has insufficient compatibility with the styrene resin thereby failing to obtain a resin composition excellent in both impact strength and visual properties. The proportion of the monomer having ethylene oxide groups in the graft component is within a range of 0.5-45 wt. %, preferably, 3-35 wt.% based on the whole graft monomer mixture. If this proportion is smaller than 0.5 wt. %, a graft copolymer having excellent handling properties cannot be obtained. If it exceeds 45 wt. % on the contrary, the impact strength of the styrene-based resin composition is reduced.

Styrene and Other Co-Monomers

The other graft component which is also employed in the present invention is styrene alone, or a mixture of styrene as a principal component and a co-monomer copolymerizable with styrene. Styrene or the monomer mixture containing styrene as its principal component is used in a proportion of 99.5-55 wt. % of the whole graft monomer mixture. If the proportion of styrene or the monomer mixture containing styrene as its principal component exceeds 99.5 wt. %, the resulting graft copolymer becomes susceptible to agglomeration. If it is smaller than 55 wt. % on the contrary, the impact resistance is reduced.

As exemplary monomers copolymerizable with styrene, may be mentioned alkyl methacrylates such as methyl methacrylate and ethyl methacrylate; alkyl acrylates such as methyl acrylate and ethyl acrylate; unsaturated nitriles such as acrylonitrile and methacrylonitrile; aromatic vinyl compounds such as α-methylstyrene; etc.

These co-monomers may each be used in combination with styrene by replacing less than 45 wt. %, preferably, less than 40 wt. % of styrene. If 45 wt. % or more of styrene is replaced by one of such co-monomers, the compatibility of the resulting graft copolymer with the styrene resin is reduced so that the impact strength of the resulting styrene based resin composition is lowered.

Graft Copolymerization

The graft copolymer useful in the practice of this invention is produced by graft-polymerizing, in the presence of a latex containing 50-80 parts by weight of a butadiene based rubbery copolymer, 50-20 parts by weight of a monomer mixture composed of 0.5-45 wt. % of a monomer containing 1-50 ethylene oxide groups and one ethylenically-unsaturated bond and 99.5-55 wt. % of styrene or a monomer mixture composed of at least 55 wt.% of styrene and less than 45 wt. % of at least one monomer which is other than styrene and is copolymerizable with styrene. The sum of the rubbery polymer and the monomer mixture is 100 parts by weight.

The monomer mixture, which is subjected to graft polymerization in the presence of the rubbery polymer latex, is used in a proportion of 50-20 parts by weight per 50-80 parts by weight of the rubbery polymer, preferably, 40-20 parts by weight per 60-80 parts by weight of the rubbery polymer. If the proportion of the rubbery polymer is smaller than 50 parts by weight, the impact-resistance-imparting effect of the graft copolymer to the styrene resin is small. If it exceeds 80 parts by weight on the contrary, the graft copolymer becomes susceptible to agglomeration so that difficulties are encountered in mixing it uniformly with the styrene resin.

The monomer mixture, which is to be graft-polymerized on the rubbery polymer, may be added at once, in several portions or continuously to the reaction system for its graft polymerization.

To such a monomer mixture, a crosslinkable monomer or chain transfer agent may be added as desired. The addition of the crosslinkable monomer improves the degree of grafting of the monomer mixture to the rubbery polymer, whereby the compatibility of the graft copolymer and styrene resin is enhanced and the impact resistance and gloss are improved further. As such a crosslinkable monomer or chain transfer agent, one or more of those described above in connection with the production of the rubbery polymer may be used suitably. Such a crosslinkable monomer or chain transfer agent may be used preferably in a proportion up to 3 wt. % of the monomer mixture. If the proportion of the crosslinkable monomer exceeds 3 wt. %, the impact resistance is reduced. It is hence not preferable to use the crosslinkable monomer in such a large proportion.

Styrene Resin

Illustrative examples of the styrene resin useful in the practice of this invention may include homopolymers obtained by singly polymerizing styrene monomers such as styrene, α-methylstyrene and chlorostyrene, namely, polystyrene, poly-α-methylstyrene, polychlorostyrene; mutual copolymers of these styrene monomers; copolymers of these styrene monomers and other co-monomers copolymerizable therewith; rubber-modified polystyrene resins obtained by polymerizing, in the presence of a rubbery polymer, at least one styrene monomer or a mixture of a styrene monomer and a co-monomer polymerizable with the styrene monomer; etc.

As other co-monomers copolymerizable with a styrene monomer, may be mentioned by way of example unsaturated nitriles such as acrylonitrile and methacrylonitrile; unsaturated carboxylic acids such as acrylic acid, methacrylic acid and maleic anhydride; alkyl methacrylates and acrylates such as methyl methacrylate, ethyl methacrylate, methyl acrylate and ethyl acrylate; etc. As illustrative examples of the rubbery polymer usable in the rubber-modified polystyrene, may be mentioned polybutadiene rubber, butadiene-styrene copolymer rubbers, butyl rubber, ethylene-propylene copolymer rubbers, etc.

The styrene resin useful in the practice of this invention contains a hard resin component, which has been derived from a styrene monomer, in a proportion of at least 50%, preferably, at least 65 wt. % of the whole resins. Illustrative examples of such a styrene resin may include polystyrene, rubber-modified polystyrene resins, styrene-acrylonitrile copolymers, styrene-methyl methacrylate copolymers, or the like.

These styrene resins may be produced by a known polymerization process such as bulk polymerization, suspension polymerization, solution polymerization, emulsion polymerization or bulk-suspension polymerization.

Mixing Proportions of the Individual Components

Regarding the mixing proportions of the graft copolymer and styrene resin, 1-100 parts by weight, preferably, 5-65 parts by weight of the graft copolymer may be used per 100 parts by weight of the styrene resin.

If the proportion of the graft copolymer is less than 1 part by weight, the impact-resistance-imparting effect is little. On the other hand, the use of the graft copolymer in any proportion greater than 100 parts by weight result in the loss of other excellent advantages of the styrene resin and moreover, is uneconomical.

The styrene based resin composition of this invention may be used as a mixture with one or more other thermoplastic resins (for example, polyphenylene ether resin or the like). Furthermore, the styrene based resin composition of this invention may be added with one or more of antioxidants, ultraviolet absorbents, lubricants, mold release agents, colorants, flame retardants, various fillers and/or the like as needed.

ADVANTAGES OF THE INVENTION

According to the present invention, a styrene based resin composition having excellent impact strength and visual properties can be obtained by blending a graft copolymer —which has been obtained by graft-polymerizing, on a butadiene based rubbery polymer, a monomer mixture composed of (i) a monomer containing 1-50 ethylene oxide groups and one ethylenically-unsaturated bond and (ii) styrene or a mixture of styrene as a principal component and another co-monomer, with a styrene resin. The styrene-based resin composition can be used advantageously for car components, components of electrical appliances, packaging containers, toys and games, sundries, and the like.

DETAILED DESCRIPTION OF PREFERRED EMBODIMENTS

The present invention will hereinafter be described in further detail by the following Examples and Comparative Examples. It should however be borne in mind that this invention is not limited to the following Examples only. Incidentally, all designations of "part" or "parts" and "%" are by part or parts by weight and wt. %.

EXAMPLE 1

(A) Production of Graft Copolymer

Components shown in Table 1 were charged in a pressure vessel equipped with a stirrer and polymerization was initiated at 50° C.

TABLE 1

|  | Part(s) |
|---|---|
| Butadiene | 70 |
| t-Dodecyl mercaptan | 0.7 |
| Diisopropylbenzene hydroperoxide | 0.08 |
| Ferrous sulfate (FeSO$_4$.7H$_2$O) | 0.002 |
| Disodium ethylenediaminetetraacetate | 0.003 |
| Sodium formaldehyde sulfoxylate | 0.04 |
| Potassium oleate | 0.2 |
| Sodium pyrophosphate | 0.1 |
| Distilled water | 150 |

Upon an elapsed time of 6 hours after the initiation of the polymerization, components of Table 2 were added. They were then reacted for 14 hours to complete the polymerization.

TABLE 2

|  | Part(s) |
|---|---|
| Potassium oleate | 0.7 |
| Diisopropylbenzene hydroperoxide | 0.06 |
| Sodium formaldehyde sulfoxylate | 0.03 |

The conversion of the polymerization reaction was approximately 100%, and the average particle size of a rubber polymer latex thus obtained was 0.11 μm.

The latex was added with 0.6 part of potassium oleate and 1.0 part of polyoxyethylene nonylphenyl ether to stabilize the rubber polymer latex. A monomer mixture shown in Table 3 was thereafter added together with a polymerization aid, followed by a graft polymerization reaction at 60° C. for 12 hours. The conversion of the polymerization reaction was approximately 100%.

TABLE 3

|  | Part(s) |
|---|---|
| Styrene | 26 |
| Methoxy polyethylene glycol methacrylate [CH$_2$=C(CH$_3$)CO(OCH$_2$CH$_2$)$_{23}$OCH$_3$] | 4 |
| Diisopropylbenzene hydroperoxide | 0.08 |
| Sodium formaldehyde sulfoxylate | 0.08 |

After adding 0.75 part of 2,6-di-t-butyl-4-methylphenol and 0.75 part of dilaurylthiodipropionate to the latex, the latex was coagulated with an aqueous solution of hydrochloric acid. The precipitate was dewatered, washed with water and then dried to obtain a graft copolymer as powder. The powder had an average particle size of about 500 μm and its particles had substantially the same shape. No agglomerates of particles were observed. The particle had excellent handling properties.

The apparent melt viscosity of the graft copolymer was $6.7 \times 10^{-3}$ poise and its grafting degree was 82%.

Incidentally, the apparent melt viscosity is the value as measured by means of a Koka's Flow Tester manufactured by Shimadzu Corp. under the following conditions. Temperature: 200° C., load: 150 Kg, preheating: 5 minutes, sample weight: 1.5 g, nozzle: 1.0 φ×10 mm. The grafting degree was measured in the following manner. A sample was immersed in benzene and left over at room temperature (about 20° C.) for 3 days. The amount (%) of the sample dissolved in benzene was measured. Assuming that the portion of the sample dissolved in benzene was the polymer as the graft component, the amount of the sample not dissolved (the grafting degree) was calculated.

(B) Production of Styrene Based Resin Composition

Twenty-five parts of the graft copolymer obtained in the above procedure (A) were blended with 100 parts of a commercial rubber-modified polystyrene resin (styrene content: about 94%; "IT-40", trade name; Idemitsu Petrochemical Co., Ltd.). The resultant blend was kneaded at 210° C. by means of an extruder having a barrel diameter of 50 mm, thereby obtaining pellets of the blend. Samples were then molded from the pellets by means of an injection molding machine and their physical properties were measured. Izod impact strength[(1)]: 27.2 kg.cm/cm; tensile strength (yield point)[(2)]: 220 kg/cm2; heat distortion temperature[(3)]: 79° C.; gloss[(4)]: 74%. In the case of the rubber-modified polystyrene alone, Izod impact strength: 6.2 kg·cm/cm; tensile strength (yield point): 240 kg/cm$^2$; heat distortion temperature: 81° C.; gloss: 56%. It is appreciated that compared with the rubber modified styrene alone, the tensile strength and heat distortion temperature have not been reduced much and the Izod impact strength and gloss (visual properties) have been improved significantly.

Measuring Methods of the Various Physical Properties (1) Izod impact strength
ASTM D-256, V-notched.
(2) Tensile strength (yield point)
ASTM D-638.
(3) Heat distortion temperature
ASTM D-648, 264 psi.
(4) Gloss
The gloss (incident angle: 60°) of a dumbbell specimen was measured in accordance with ASTM D 638.

Examples 2-6 and Comparative Examples 1-2:

Graft copolymers were produced separately in the same manner as in Example 1 except that the composition of monomers graft-polymerized on a rubbery polymer obtained in the same manner as in Example 1 was changed, and styrene based resin compositions were then produced in the same manner as in Example 1. Properties of the thus-obtained graft copolymers and performances of molded items obtained respectively from the styrene based resin compositions are shown in Table 4.

The graft copolymers of the present invention (Examples 2-6) were substantially free of visible agglomerated particles and had excellent handling properties. From styrene based resin compositions containing these graft copolymers respectively, were obtained molded articles satisfactory in both impact strength and gloss (visual properties).

On the other hand, when methoxy polyethylene glycol methacrylate was not included in the rubbery polymer latex and styrene was alone graft-polymerized (Comparative Example 1) and when methoxy polyethylene glycol methacrylate was included in the graft component but its proportion was outside the corresponding range specified in the present invention (Comparative Example 2), the resultant graft copolymers were agglomerated and had very poor handling properties. Further, they failed to provide a styrene based resin composition satisfactory in both impact strength and gloss (visual properties).

EXAMPLES 7-9

When production was conducted in the same manner as in Example 1 by using methoxy polyethylene glycol methacrylate having a different number of ethylene oxide groups from the number of ethylene oxide groups in the methoxy polyethylene glycol methacrylate used in Example 4 and employing styrene and the methoxy polyethylene glycol methacrylate in the same proportions as in Example 4 (Examples 7 and 8) or when production was effected by using graft components of the same composition as those used in Example 1 but conducting the graft polymerization in two stages instead of one stage (Example 9). The compositions of graft monomers, properties of graft copolymers and physical properties of the styrene resin composition are summarized in Table 4.

The styrene based resin compositions of this invention are excellent in both Izod impact strength and gloss (visual properties) and moreover, the resultant graft copolymer resins had satisfactory handling properties.

TABLE 4

| | Composition of graft copolymer [part(s)] | | | | | | | Properties of graft copolymer[6] | Properties of styrene based resin composition | |
|---|---|---|---|---|---|---|---|---|---|---|
| | Rubber component | | First graft component | | | Second graft component | | | Izod impact strength [kg cm/cm] | Gloss (%) |
| | BT[1] | t-DM[2] | ST[3] | PEGMA[4] | | MMA[5] | ST | PEGMA | | | |
| Ex. 2 | 70 | 0.7 | 29 | 1 | Number of ethylene oxide groups: 23 | 0 | — | — | | 25.8 | 73 |
| Ex. 3 | 70 | 0.7 | 27 | 3 | Number of ethylene oxide groups: 23 | 0 | — | — | | 26.7 | 74 |
| Ex. 4 | 70 | 0.7 | 24 | 6 | Number of ethylene oxide groups: 23 | 0 | — | — | | 26.5 | 74 |
| Ex. 5 | 70 | 0.7 | 20 | 10 | Number of ethylene oxide groups: 23 | 0 | — | — | Average particle size ranged from about 300-800 μm. Almost no agglomerated particles were observed. Particles had a uniform shape | 26.3 | 73 |
| Ex. 6 | 70 | 0.7 | 15 | 10 | Number of ethylene oxide groups: 23 | 5 | — | — | | 25.9 | 72 |
| Ex. 7 | 70 | 0.7 | 24 | 6 | Number of ethylene oxide groups: 2 | 0 | — | — | | 26.4 | 73 |
| Ex. 8 | 70 | 0.7 | 24 | 6 | Number of ethylene oxide groups: 15 | 0 | — | — | | 26.6 | 73 |
| Ex. 9 | 70 | 0.7 | 13 | 2 | Number of ethylene oxide groups: 23 | 0 | 13 | 2 | Number of ethylene oxide groups: 23 | 27.0 | 74 |
| Comp. Ex. 1 | 70 | 0.7 | 30 | 0 | | 0 | — | — | Agglomerated into 2-5 mm balls | 19.4 | 57 |
| Comp. Ex. 2 | 70 | 0.7 | 15 | 15 | Number of ethylene oxide groups: 23 | 0 | — | — | Agglomerated into 5-10 mm balls | 18.6 | 57 |

[1]BT: butadiene,
[2]t-DM: t-dodecyl mercaptan,
[3]ST: styrene,
[4]PEGMA: polyethylene glycol methoxy methacrylate:
Number of ethylene oxide groups: 2 $CH_2 = C(CH_3)CO(OCH_2CH_2)_2OCH_3$
Number of ethylene oxide groups: 15 $CH_2 = C(CH_3)CO(OCH_2CH_2)_{15}OCH_3$
Number of ethylene oxide groups: 23 $CH_2 = C(CH_3)CO(OCH_2CH_2)_{23}OCH_3$
[5]MMA: methyl methacrylate,
[6]observed microscopically,

EXAMPLES 10-11 and Comparative Example 3

To a rubbery copolymer latex obtained in the same manner as in Example 1, 0.059 parts of sodium dioctyl sulfosuccinate was added to stabilize the latex. Thereafter, a 0.2% aqueous solution of hydrochloric acid and a 2% aqueous solution of sodium hydroxide were added through separate nozzles while maintaining the pH of the latex within a range of 8.0–9.0, whereby particles of the latex are caused to agglomerate into coarse particles so that rubber latexes having average particle sizes of 0.3 μm (Example 10) and 0.4 μm (Example 11) respectively were obtained. Graft copolymers were then produced in the same manner as in Example 1 except that the above-prepared latexes were used separately.

As a comparative example (Comparative Example 3), a graft copolymer was synthesized using the agglomerated rubber latex of Example 10 and graft components whose monomer composition was the same as that of the graft components in Comparative Example 1. To 100 parts of commercial polystyrene ("Styron 683", trade name; product of Asahi Chemical Industry Co., Ltd.), 43 parts of the graft copolymers were separately blended in the same manner as in Example 1. In Examples 10 and 11, the Izod impact strengths of the resultant styrene based resin compositions were 4.5 kg·cm/cm (Example 10) and 5.0 kg·cm/cm (Example 11) respectively. Compared with 1.0 kg·cm/cm in the case of the polystyrene alone, the styrene based resin compositions of Examples 10 and 11 are extremely superior in impact strength. It is also understood that the styrene based resin compositions of this invention have impact strengths improved over the Izod impact strength of the styrene based resin composition of Comparative Example 3, namely, 3.0 kg·cm/cm.

We claim:

1. A styrene based resin composition comprising:
   (I) 100 parts by weight of a styrene resin; and
   (II) 1–100 parts by weight of a graft copolymer obtained by graft-polymerizing, in the presence of (A) 50–80 parts by weight of a rubbery polymer obtained from butadiene or a mixture of at least 50 wt. % of butadiene and less than 50 wt. % of at least one monomer which is other than butadiene and is copolymerizable with butadiene, said rubbery polymer comprising a latex having an average particle size of 0.08 to 0.8 μm, (B) 50–20 parts by weight of a monomer mixture composed of (B-1) 0.5–45 wt. % of a monomer containing 1–50 ethylene oxide groups and one ethylenically-unsaturated bond and (B-2) 99.5–55 wt. % of styrene or a monomer mixture composed of at least 55 wt. % of styrene and less than 45 wt. % of at least one monomer which is other than styrene and is copolymerizable with styrene, the sum of said rubbery polymer (A) and said monomer mixture (B) being 100 parts by weight.

2. The styrene based resin composition as claimed in claim 1, wherein the monomer (B-1) containing 1–50 ethylene oxide groups and one ethylenically-unsaturated bond is at least one monomer selected from methoxy monoethylene glycol acrylate, methoxy monoethylene glycol methacrylate, methoxy polyethylene glycol acrylates and methoxy polyethylene glycol methacrylates, and the polyethylene glycol residuum in each of the methoxy polyethylene glycol acrylates and methoxy polyethylene glycol methacrylates contains 2–50 ethylene oxide groups.

3. The styrene based resin composition as claimed in claim 1, wherein the styrene resin (I) is at least one resin selected from polystyrene, rubber-modified polystyrene, styrene-acrylonitrile copolymers and styrene-methyl methacrylate copolymers.

* * * * *